(No Model.) 2 Sheets—Sheet 1.

J. R. JAMES.
HAMMER FOR WELDING LOCOMOTIVE FRAMES.

No. 332,536. Patented Dec. 15, 1885.

WITNESSES:
Theo. G. Hoster
C. Sedgwick

INVENTOR:
J. R. James
BY Munn & Co
ATTORNEYS.

(No Model.) 2 Sheets—Sheet 2.
J. R. JAMES.
HAMMER FOR WELDING LOCOMOTIVE FRAMES.
No. 332,536. Patented Dec. 15, 1885.
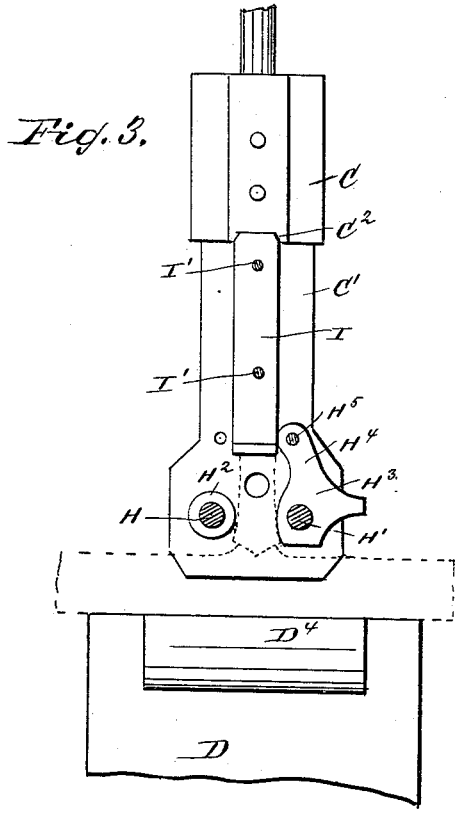
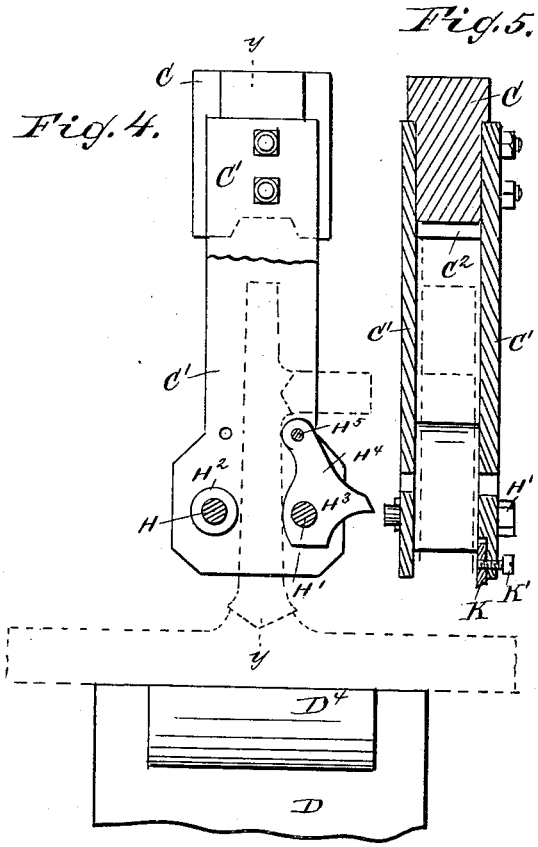
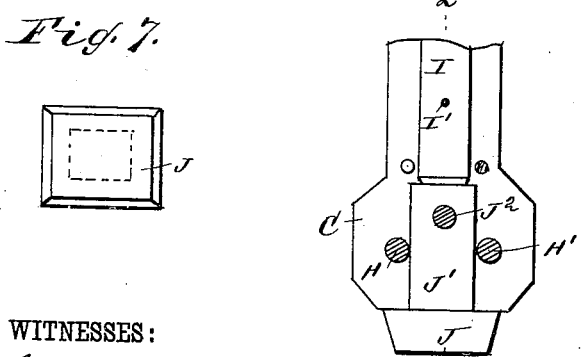
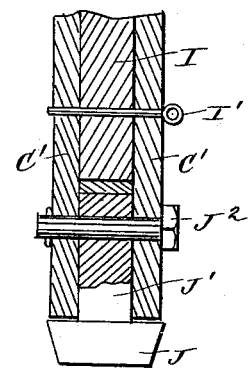
WITNESSES:
INVENTOR:
J. R. James
BY Munn & Co
ATTORNEYS.
N. PETERS, Photo-Lithographer, Washington, D. C.

UNITED STATES PATENT OFFICE.

JOHN R. JAMES, OF DUNKIRK, NEW YORK.

HAMMER FOR WELDING LOCOMOTIVE-FRAMES.

SPECIFICATION forming part of Letters Patent No. 332,536, dated December 15, 1885.

Application filed May 5, 1885. Serial No. 164,484. (No model.)

*To all whom it may concern:*

Be it known that I, JOHN R. JAMES, of Dunkirk, in the county of Chautauqua and State of New York, have invented certain new and useful Improvements in Welding Locomotive-Frames, of which the following is a full, clear, and exact description.

The object of my invention is to weld locomotive-frames with a steam-hammer.

The invention consists of the construction and operation of parts, as will be hereinafter fully described and claimed.

Reference is to be had to the accompanying drawings, forming part of this specification, in which similar letters of reference indicate corresponding parts in all the figures.

Figure 1:
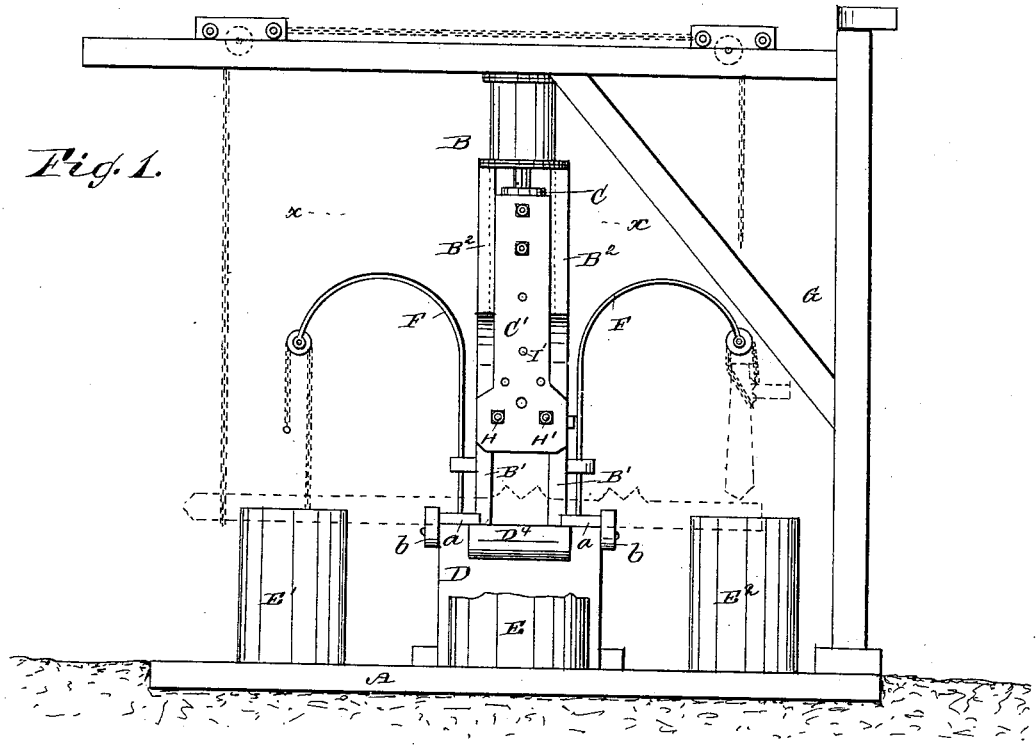
Figure 2:
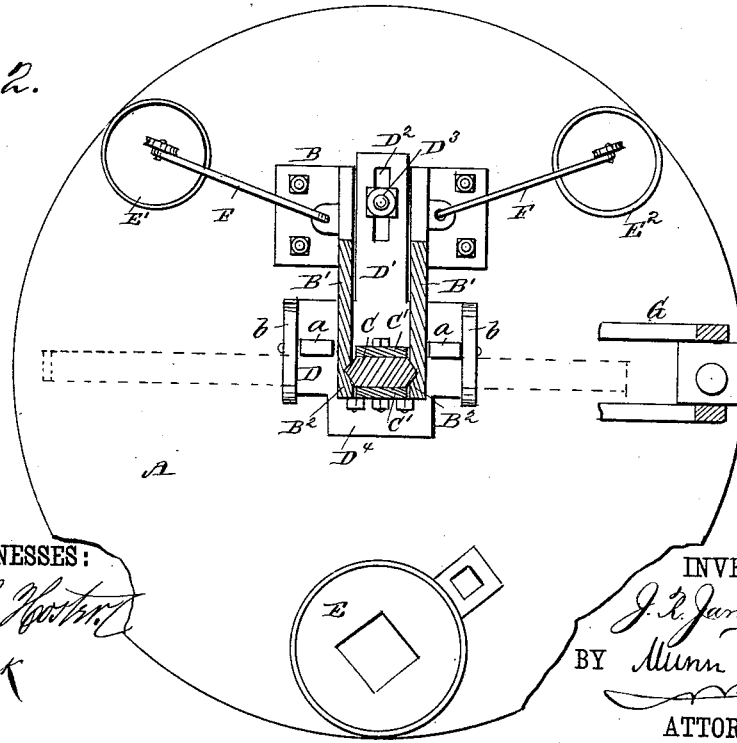

Figure 1 is a side elevation of my invention. Fig. 2 is a sectional plan view on the lines $x\,x$ of Fig. 1. Fig. 3 is a front elevation of the hammer-head with dies for welding the dabs on the legs of the pedestals of the frames, the front plate being removed. Fig. 4 is a front elevation of the hammer-head, showing the leg (in dotted lines) inserted between the dies. Fig. 5 is a vertical section on the lines $y\,y$ of Fig. 4. Fig. 6 is a front elevation of the hammer-block with front plate removed, and showing a die for welding the braces to the locomotive-frames. Fig. 7 is a bottom view of the die shown in Fig. 6, and Fig. 8 is a vertical section on the lines $z\,z$ of Fig. 6.

On a base-plate, A, is mounted near its center a steam-hammer, B, having the standards B′ B′, provided on their front edges with grooved guides B², B², in which slides the hammer-head C, provided with removable plates C′ C′, carrying the various dies used in welding the different parts of the locomotive-frame. The anvil D is provided with an extension, D′, placed between the standards B′ B′, and fastened by a bolt and nut, D³, to the base-plate of the hammer B. The bolt D³ passes through a slot, D², in the extension D′, whereby the anvil is made adjustable, so as to weld on the center of the anvil D, or on its front horn, D⁴, when desired. The anvil D is provided on its top with guide-stops $a\,a$, against which rests the rear edge of the pedestal of the locomotive-frame while being welded, and is provided on each side with pivoted catches $b$, to hold the pedestal of the locomotive-frame in place. Grouped in a circle around the hammer B are furnaces E, E′, and E², of which the main furnace E is placed in front of the steam-hammer B, and is provided with two fires and used for heating the main frame and the braces; and the furnaces E′ and E² are placed on each side to the rear of the steam-hammer B, and are used for heating the legs of the pedestals. To each outer side of the standards B′ is attached a davit, F, for lifting and swinging the legs of the pedestals to and from the hammer B and the furnaces E′ and E². The base-plate A is provided with a swinging crane, G, provided with chains, pulleys, runners, &c., to which the pedestal of the locomotive-frame is attached near its ends, so as to be easily manipulated under the anvil D and swung to and from the anvil D to the main furnace E to be heated. The side plates, C′ C′, are provided near the lower end with steel pins H H′, passing through both plates C′ and held in the same in any suitable manner. On the pin H is placed a bushing, H², for forging the rounded outside part of the pedestal to which the legs are welded, and on the pin H′ is placed the die H³, shaped to forge the inclined inside of the pedestal. The die H³ is provided with a vertical extension, H⁴, through which passes a pin, H⁵, which holds the die H³ in place between the plates C′ C′, the pin H⁵ being fastened in the plates C′ C′. A center bar, I, is fastened between the plates C′ C′ by pins I′, and reaching to the hammer-head C, which is provided on its bottom side with a recess, C², and fits over the top end of the center bar, I. The dabs to be welded onto the legs of the pedestals are placed between the bushing H² and the die H³, and the hammer-head C being set in motion strikes the dab by means of the center bar, I, and forges the same to the leg of the pedestal, as shown in dotted lines in Fig. 3. The pin H is then withdrawn, and the bushing H² removed, and also the center bar, I, from the plates C′ C′ by any suitable means, and the leg of the pedestal, being heated over the furnace E′, is swung by the davit F to the hammer-head C, and placed between the plates C′ C′ and against die H³. The pin H and the bushing H² being again replaced hold the leg in position, as shown in dotted lines in Fig. 4. The pedestal of the locomotive-frame to which the leg is to be welded has been treated under the hammer with the bushing $H^2$ and the die $H^3$, to form the desired shape for the lower end of the leg, and the frame, having been heated over the fire on the main furnace E, is swung by the crane G to the anvil D, and the heated leg set in position on the frame, as shown in Fig. 4. The hammer-head B, being set in motion, strikes the top end of the leg and forges the same to the pedestal of the locomotive-frame, the bushing $H^2$, the die $H^3$, and the side plates, C' C', acting as guides for the leg. The outer plate C' is provided on its lower end with a steel cutter, K, adjustable in the plate C' by the set-screw K', which cutter K, when the hammer-head B is moved up and down, assists in welding and cuts the sides to the proper size of the pedestals of the locomotive-frame. As soon as the leg is welded to the pedestal, the pin H and bushing $H^2$ are again removed, so that the leg can be withdrawn from the plates C' C'. The braces for the locomotive-frames are forged by an ordinary die, J, placed with its shank J' between the steel pins H and H' and fastened by a steel pin, $J^2$. The anvil, being adjustable by means of bolt and nut $D^3$ and slot $D^2$, is moved backward, so as to bring the horn D' of the anvil D directly under the die J, to weld the braces to the frame. The braces are heated with the main frame over the furnace E, which is provided with two fires.

Having thus described my invention, what I claim as new, and desire to secure by Letters Patent, is—

1. In a steam-hammer for welding locomotive-frames, the hammer-head C, having a recess, $C^2$, and provided with the side plates, C' C', the pins H and H', the bushing $H^2$, the die $H^3$, fastened by the pin $H^5$, and the center bar, substantially as shown and described.

2. In a steam-hammer for welding locomotive-frames, the hammer-head C, having a recess, $C^2$, and provided with the side plates, C' C', the pins H and H', the bushing $H^2$, and the die $H^3$, fastened by the pin $H^5$, substantially as shown and described.

3. In a steam-hammer for welding locomotive-frames, the combination of the hammer-head C, having the recess $C^2$, and provided with the side plates, C' C', the pins H and H', the bushing $H^2$, the die $H^3$, fastened by the pin $H^5$, and the steel cutter K, substantially as shown and described.

4. In a steam-hammer for welding locomotive-frames, a hammer-head consisting of the side plates, C' C', and the removable pins H H', and the intermediate removable pin, $J^2$, all passed through apertures in the lower ends of said plates, whereby the series of interchangeable dies may be used and the parts of the locomotive-frame be held and guided between said plates, substantially as set forth.

5. The combination, with the side plates, C' C', and the removable pins H H', connecting the lower ends of said plates, of the removable bushing $H^2$ on the pin H, and the removable die $H^3$ on the pin H', a space being left between the said pins, for the purpose set forth.

6. The combination, with the side plates, C' C', having two spaced dies mounted between their lower ends, of the cutter K, removably secured to the lower edge of one of the said plates, below the dies, substantially as set forth.

JOHN R. JAMES.

Witnesses:
JOHN R. JAMES, Jr.,
FRANCIS S. EDWARDS.